T. M. CHANCE.
LAMP EMPLOYING A COMBUSTIBLE GAS.
APPLICATION FILED DEC. 14, 1915.
1,198,006. Patented Sept. 12, 1916.
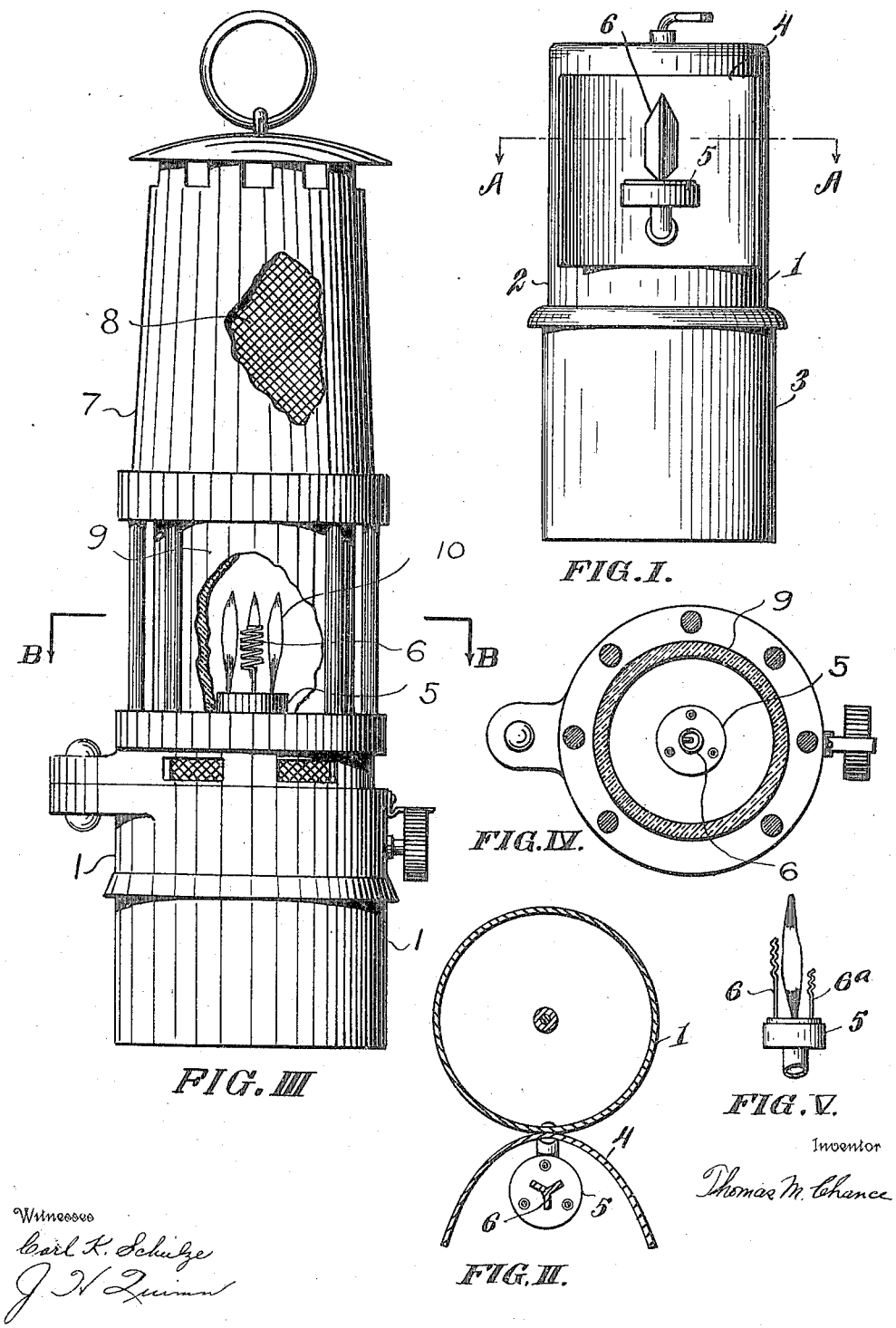
FIG. I.
FIG. III
FIG. IV.
FIG. II.
FIG. V.
Witnesses
Carl K. Schulze
J. N. Quinn
Inventor
Thomas M. Chance

UNITED STATES PATENT OFFICE.

THOMAS M. CHANCE, OF PHILADELPHIA, PENNSYLVANIA.

LAMP EMPLOYING A COMBUSTIBLE GAS.

1,198,006.  Specification of Letters Patent.  Patented Sept. 12, 1916.

Application filed December 14, 1915. Serial No. 66,812.

*To all whom it may concern:*

Be it known that I, THOMAS M. CHANCE, a citizen of the United States, residing at Philadelphia, in the county of Philadelphia and State of Pennsylvania, have invented a certain new and useful Improvement in Lamps Employing a Combustible Gas, of which the following is a specification.

The object of my invention is to provide an improved method of constructing and operating the burners for lamps of the described class whereby the flame of said lamp will be reëstablished after said flames have been extinguished by the concussion produced from blasting, or by the action of strong currents of air. As such lamps, as at present constructed, provide no automatic means for accomplishing this result, the use of this type of lamp as a safety lamp for use in gaseous mines is impossible. If a manually operated igniting device be used, the time elapsing between the extinguishing of the gas jet and its re-ignition by the miner would in many cases be sufficient to allow the accumulation of unburnt gas to form an explosive mixture in the body of the lamp, and the ignition of this explosive mixture might produce an explosion which would wreck the lamp and fire the mine gases exterior to the lamp, thus entirely defeating the purpose of the safety lamp.

I attain the desired end by so constructing the burner of the lamp as to permit of the placing, close to the flame, of a substance that will become highly heated by the heat of the flame, but at the same time will not be in actual contact with the flame. The location of this heated substance, which I shall hereinafter call the re-igniter, must be such that it will attain the desired temperature without causing the deposition of carbon from the burning jet and yet will be in such proximity to the path of the gas issuing from said burner as to cause the re-ignition of this gas if the flame is extinguished and the jet is immediately reëstablished.

My invention is illustrated diagrammatically by the drawings, in which—

Figure I is a vertical view of an open acetylene lamp embodying my invention; Fig. II is a view showing the burner of said lamp on section line A—A; Fig. III is a vertical view of an acetylene safety lamp of the bonneted type, employing my invention, the metal bonnet and glass shield being broken away to show the construction, Fig. IV is a horizontal cross-sectional view on line B—B and Fig. V illustrates a multiple type of re-igniter.

In the several drawings like numbers indicate like parts.

In the drawings Fig. I and Fig. II, 1 indicates a generator comprising a water receptacle 2 and a calcium carbid container 3, 4 is a reflector and 5 is the burner, in this case shown as a three-jet device. The re-igniter is indicated by the numeral 6 and is here shown as consisting of three wings carried on a central stem. The water feed, pressure regulator, etc., of this type of lamp are well known devices in common use in acetylene lamps and do not require description to any skilled in the art.

The operation of the apparatus just described is as follows: Water flowing from the receptacle 1 into container 2 and coming in contact with the calcium carbid contained therein, generates acetylene gas by chemical reaction. Said gas escapes from the lamp by means of the burner 5 and the resultant jets are ignited by match or other igniter and burn in the space above said burner 5. The heat radiated and conducted from said jets then raises the temperature of the re-igniter 6 until finally said temperature equals or exceeds the kindling point of the acetylene. The apparatus is now in operative condition. If a sudden increase in atmospheric pressure,—such as is produced by the concussion from an explosive (blasting),—causes extinction of the flame, the stored heat contained in the re-igniter 6 will instantly re-light the gas when the jets again establish themselves. A similar re-ignition of the jets will occur if the flame be extinguished by a strong current of air or by jarring of the lamp.

In the drawings Figs. III and IV, 1 indicates a generator for producing acetylene gas, 5 a multiple-jet burner, 6 a wire coil re-igniter, 7 the bonnet or metal protective shield, 8 the wire gauze, and 9 a cylindrical glass shield within which the position of the flame is indicated by the numeral 10.

The operation of the apparatus is precisely similar to that shown by Figs. I and II and does not require further description. The presence of the gauze 8 acts to prevent ignition of combustible gas exterior to the lamp, as in the ordinary forms of safety lamp. It should be here pointed out that any type, or combination of types, of safety lamp in common use may be employed with my improvement by any skilled in the art, and that the advantages of the well-known oil-burning safety lamp may be secured coupled with the greatly superior illumination afforded by the use of a high heat value gas, a result heretofore impossible of attainment.

It is essential to the successful operation of the apparatus that the following requirements be met: 1st, the re-igniter must possess sufficient heat capacity to keep its temperature above the kindling point of the gas during the time the flame is extinguished; 2nd, the re-igniter must have some portion of its surface at this temperature in contact with the combustible gas to be ignited; 3rd, the re-igniter should not be in contact with the flame, while same is burning under normal conditions; 4th, the re-igniter must present an active hot surface to the combustible gas irrespective of the varying heights of flame that are due to unavoidable variations in the pressure and quantity of the gas supplied,—hence a re-igniter carried above the flame cannot generally be employed, as small variations in flame heights render such an apparatus inoperative; 5th, the re-igniter must be so designed as to lose a minimum quantity of heat from radiation and conduction, otherwise it will not be kept at the required temperature by a relatively low flame.

I have found that these conditions are most easily attained by constructing the burner with a plurality of jets exterior to the re-igniter, or with an annular flame. These conditions may also be met by using a re-igniter of a form that will radiate a minimum quantity of heat from that portion not exposed to the direct radiation of the flame, whereby the portion nearest the flame will remain at the desired high temperature. It will be understood that as the re-igniter is being constantly heated from heat radiated from the lamp flames, and is at the same time losing heat by radiation, the flames should be so arranged as to make the open space between them small, thus increasing the quantity of heat received by the re-igniter. In some cases it may be desirable to have the flames coalesce into a continuous or annular ring of flame, and the term "plurality," or "multiple," when used in this specification and the claims hereof is intended to denote any number greater than one and to include an infinite number of orifices forming the continuous aperture of an annular burner, such as will produce a single annular flame.

The re-igniter may be constructed of a refractory material, or it may be made of a metallic material,—nickel alloy wire being especially applicable. In general I have found that a white refractory of low heat conductivity is especially suitable, although I have successfully used nickel alloy. When the re-igniter is made of the same refractory material that composes the burner, it may be constructed integral with the burner, a construction of this kind being particularly adapted to mine lamps. It will also be clear that it may sometimes be desirable to use a plurality of re-igniters with one burner to provide certain re-ignition at different heights of flame, and such plural re-igniters may be used without departing from the spirit of my invention, it being expressly understood that the word "re-igniter" where used in the claims hereto is meant to include such plural form. Such an arrangement is illustrated in Fig. V, in which a burner 5, in this case shown as a single jet device, is provided with two re-igniters 6 and 6ª, re-igniter 6 being so proportioned as to be maintained at maximum temperature at one height of flame, and re-igniter 6ª being of such proportions as to reach its maximum temperature at a lower height of said flame.

It will of course be understood that my invention can be carried out in safety lamps using wire gauze or any equivalent means for preventing the propagation of combustion from the interior of the lamp to an inflammable atmosphere exterior to the lamp, and as many materials with perforations, apertures or channels through which air may freely pass, but which are too small to permit the propagation of combustion, have been used for this purpose, I have used the word foraminous to designate materials containing such holes, apertures or channels.

Having described my invention, I claim:

1. An improved safety lamp of the described class comprising in combination, a source of combustible gas supply, means for utilizing said gas, said means comprising a burner, means for the re-ignition of the flame of said burner, said means consisting of a re-igniting device located adjacent to the zone of said flame and adapted to re-ignite said flame by heat previously stored therefrom, and foraminous means for preventing the propagation of flame to the exterior of said lamp.

2. An improved safety lamp of the described class comprising in combination, a source of combustible gas supply, means for utilizing said gas, said means comprising a multiple jet burner, means for the re-ignition of the flames of said burner, said means consisting of a re-igniting device located within the zone of said flames and adapted to re-ignite said flames by heat previously stored therefrom, and foraminous means for preventing the propagation of flame to the exterior of said lamp.

3. An improved safety lamp of the described class comprising in combination, means for supplying combustible gas, a multiple jet burner provided with a re-igniting device located within the zone of flames produced by said burner, a wire gauze located above the zone of said flames, a glass shield surrounding said flames and comprising in conjunction with said means for gas supply and said wire gauze a complete envelop surrounding said flames.

In testimony whereof I have hereunto signed my name at Philadelphia, Pennsylvania, this 13th day of December, 1915.

THOMAS M. CHANCE.

Witnesses:
CARL K. SCHULZE,
CHAS. S. NASH.

Copies of this patent may be obtained for five cents each, by addressing the "Commissioner of Patents, Washington, D. C."